US006880693B2

(12) United States Patent
Trestain

(10) Patent No.: US 6,880,693 B2
(45) Date of Patent: *Apr. 19, 2005

(54) CONVEYOR MOTOR HAVING BELLOWS

(76) Inventor: Dennis A. Trestain, 1306 Jack Henry Dr., Charlotte, MI (US) 48813

( * ) Notice: Subject to any disclaimer, the term of this patent is extended or adjusted under 35 U.S.C. 154(b) by 0 days.

This patent is subject to a terminal disclaimer.

(21) Appl. No.: 10/820,690

(22) Filed: Apr. 8, 2004

(65) Prior Publication Data

US 2004/0188227 A1 Sep. 30, 2004

Related U.S. Application Data

(63) Continuation of application No. 10/342,927, filed on Jan. 15, 2003, now Pat. No. 6,722,492.
(60) Provisional application No. 60/349,091, filed on Jan. 16, 2002.

(51) Int. Cl.[7] .............................................. B65G 27/22
(52) U.S. Cl. ..................................... 198/768; 198/750.8
(58) Field of Search ............................... 198/768, 750.8, 198/750.1, 750.5, 750.7, 771, 767, 769

(56) References Cited

U.S. PATENT DOCUMENTS

| 1,146,947 | A | 7/1915 | Norton |
| 2,214,755 | A | 9/1940 | Tafel |
| 2,378,979 | A | 6/1945 | Burt |
| 2,473,193 | A | 6/1949 | Campion |
| 4,508,208 | A | 4/1985 | Preedy |
| 5,794,757 | A | 8/1998 | Svejkovsky et al. |
| 5,850,906 | A | 12/1998 | Dean |
| 6,209,713 | B1 | 4/2001 | Takahashi et al. |
| 2004/0060802 | A1 | 4/2004 | Kwasniewicz et al. |
| 2004/0060803 | A1 | 4/2004 | Kwasniewicz et al. |

FOREIGN PATENT DOCUMENTS

WO    WO/01/76988 A1    10/2001

OTHER PUBLICATIONS

U.S. Appl. No. 10/277,452, Kwasniewicz et al, Pneumatically Actuated Beltless Conveyor.

Primary Examiner—James R. Bidwell
(74) Attorney, Agent, or Firm—Mary M. Moyne; Ian C. McLeod

(57) ABSTRACT

A differential impulse conveyor having a conveyor motor which uses bellows to provide the driving force for the conveyor. The conveyor includes a housing within which is mounted the conveyor motor. The conveyor motor has a pair of bellows, a drive plate and a fluid control system. The drive plate is movably mounted between the bellows. The conveyor plate is mounted to the top end of the drive plate. The fluid control system includes a main control valve, a pair of limit switches, a pair of valves and a flow control valve. The fluid control system allows for inflation of one bellow at a greater rate than inflation of the other bellow.

39 Claims, 5 Drawing Sheets

CONVEYOR MOTOR HAVING BELLOWS

CROSS-REFERENCE TO RELATED APPLICATIONS

This application is a continuation of Ser. No. 10/342,927 filed Jan. 15, 2003, now U.S. Pat. No. 6,722,492, which claims the benefit of U.S. Provisional Application No. 60/349,091, filed Jan. 16, 2002.

STATEMENT REGARDING FEDERALLY SPONSORED RESEARCH OR DEVELOPMENT

Not Applicable

BACKGROUND OF THE INVENTION (1) Field of the Invention

The present invention relates to a conveyor motor for use in a differential impulse conveyor. In particular, the present invention relates to a pneumatic conveyor motor which uses pneumatic bellows to provide the reciprocating motion for moving the objects along the conveyor.

(2) Description of the Related Art

Differential impulse conveyors, also known as linear motion conveyors, move objects along a surface or tray by varying the direction and speed of the movement of the surface. The conveyor motor moves the conveyor surface slowly in a forward direction to convey the objects forward. The conveyor motor then moves the conveyor surface quickly in the opposite or backward direction. As the conveyor surface is quickly moved backwards, the objects slide along the surface such that the objects remain in the forward position. The slow forward and fast rearward motion is repeated to move the objects along the surface in the forward direction.

The related art has shown various types of differential impulse conveyors where the conveying surface is driven in the forward direction at a slow speed and is driven in the backward direction at a higher speed. Illustrative are U.S. Pat. Nos. 5,794,757 to Svejkowsky et al.; U.S. Pat. No. 5,850,906 to Dean and U.S. Pat. No. 6,209,713 to Takahashi et al. The conveyors use a variety of different drive motors. However, none of the conveyors use bellows as the drive mechanism.

U.S. Pat. No. 1,146,947 to Norton; U.S. Pat. No. 2,214,755 to Tafel; U.S. Pat. No. 2,473,193 to Campion; and U.S. Pat. No. 4,508,208 to Preedy describe pneumatic transporters or conveyors which use pneumatic cylinders, pistons and seals to provide the drive or momentum for the conveyor. A fluid such as air can be used to move the pistons. However, none of the patents show the use of pneumatic bellows.

Also, of interest is U.S. Pat. No. 2,378,979 to Burt which describes a vibrating conveyor which uses a pressure responsive element such as a bellow or flexible diaphragm to create vibrations which are transferred to a conveyor table. The conveyor of this reference is a vibration conveyor rather than a differential impulse conveyor as in the present invention. Further, the pressure response element of this patent is operated by water.

There remains the need for a differential impulse conveyor which uses pneumatic bellows as the drive motor. Bellows have inherent qualities of low maintenance, tolerance to lateral misalignment, high resistance to contamination and frictionless stroke. Bellows are also capable of generating high forces and need no lubrication. Thus, the use of bellows enables the present invention to be inexpensive to construct and inexpensive to maintain.

SUMMARY OF THE INVENTION

The present invention relates to a differential impulse conveyor having a conveyor motor which uses bellows to provide the driving force for the conveyor. The conveyor is intended to be used to move objects such as parts and/or scrap out of a stamping press. The conveyor includes a housing within which is mounted the conveyor motor. The conveyor motor has a pair of first and second bellows, a drive plate and a fluid control system. The bellows are mounted at the first end to end plates. The end plates have holes which align with the inlet of the bellows to allow for inflating the bellows. The end plates are connected together by a pair of upper guide rods and a pair of lower guide rods. The drive plate is mounted between the first and second bellows adjacent the second ends of the bellows. The drive plate is movably mounted on the guide rods. A follower plate can also be provided adjacent the second end plate on a side opposite the bellows. The follower plate is movably mounted on the upper guide rods. The conveyor plate is mounted to the top ends of the drive plate and the follower plate. The fluid control system includes a main control valve, first and second valves, a first and second limit switch, and a flow control valve. The main control valve is connected to the first and second valves which are connected to the inlets of the bellows. The main control valve controls the flow of fluid to the bellows from the fluid source. The fluid is preferably compressed air. The limit switches are connected to the main control valve and are mounted adjacent the end plates. In one (1) embodiment, the limit switches are pneumatic switches and are provided with fluid from the fluid source. The inlets of the limit switch are connected to the fluid source and the outlets of the limit switches are connected to the main control valve. The flow control valve can be provided in the fluid line between the outlet of either of the limit switches and the main control valve. The flow control valve alters and controls the signal provided to the main control valve by the limit switch. The conveyor can be a bi-directional conveyor. In this embodiment, flow control valves are provided for each of the limit switches. A bi-directional control switch is provided to allow for bypassing one of the flow control valves depending on the direction of the conveyor.

To move objects toward the second end of the conveyor, fluid from the fluid supply is provided through the main control valve through the first valve and to the inlet of the first bellows. As the first bellows inflates, the drive plate with the conveyor plate moves toward the second bellows. The drive plate continues to move until the drive plate contacts the second limit switch and activates the second limit switch. Upon activation, the second limit switch sends a signal to the main control valve. The main control valve stops the flow of fluid to the first bellows and starts the flow of fluid to the second bellows. As the second bellow inflates, the drive plate moves toward the first bellows and causes the first bellows to deflate. The drive plate continues to move until the drive plate contacts the first limit switch and activates the first limit switch. Upon activation, the first limit switch sends a signal to the main control valve. The first flow control valve located in the line between the first limit switch and the main control valve alters and controls the signal from the first limit switch to the main control valve. The first flow control valve alters the signal such that the switching or activation of the main control valve is delayed such that there is a pause between the time the fluid flow is stopped to the second bellows and the fluid flow begins to the first bellows. This delay causes a pause in the motion of the drive plate and thus, the conveyor plate. The pause in motion allows the conveyor plate to reestablish contact with the objects on the conveyor plate. The flow control valve also alters the signal such that the rate of flow of the fluid to the first bellows gradually increases. This allows for slower inflation of the first bellows and slower movement of the conveyor plate. To move objects in the other direction, the bi-directional switch is activated such that the first flow control valve is bypassed and the second control valve is operational. The second flow control valve alters the signal from the second limit switch to the main control valve similar to the first flow control valve such that the rate of fluid flow to the second bellows is less than the rate of fluid flow to the first bellows.

The present invention relates to a conveyor motor for moving a conveyor plate to move objects along the conveyor plate, which comprises: a drive plate movably mounted, having a first side and a second side and connected to the conveyor plate; a first bellows mounted adjacent the first side of the drive plate and configured to contact the first side of the drive plate and having an inlet; a second bellows mounted adjacent the second side of the drive plate and configured to contact the second side of the drive plate and having an inlet; and a main control valve in fluid communication with the inlet of the first bellows and the inlet of the second bellows wherein the main control valve is configured such that a rate of inflation of the second bellows is greater than a rate of inflation of the first bellows.

Further, the present invention relates to a conveyor for moving objects, which comprises: a housing; a drive plate having a first side and a second side and movably mounted in the housing; a first bellows mounted in the housing adjacent the first side of the drive plate and configured to contact the first side of the drive plate and having an inlet; a second bellows mounted in the housing adjacent the second side of the drive plate and configured to contact the second side of the drive plate and having an inlet; and a main control valve in fluid communication with the inlet of the first bellows and the inlet of the second bellows wherein the main valve is configured such that a rate of inflation of the second bellows is greater than a rate of inflation of the first bellows.

Still further, the present invention relates to a method for moving objects, which comprises: providing a conveyor including a conveyor motor having a drive plate with a first and second side and a conveyor plate connected to the drive plate; a first bellows adjacent to and configured to contact the first side of the drive plate and having an inlet; a second bellows adjacent to and configured to contact the second side of the drive plate, and having an inlet; and a main control valve in fluid communication with the inlet of the first bellows and the inlet of the second bellows; providing a fluid source; connecting the fluid source to the main control valve; activating the main control valve such that fluid flows from the fluid source into the inlet of the first bellows such that the first bellows inflates at a predetermined rate of inflation of the first bellows wherein as the first bellows inflates the first bellows contacts the drive plate and moves the drive plate toward the second bellows; activating the main control valve such that the fluid stops flowing to the first bellows and such that fluid flows from the fluid source into the inlet of the second bellows such that the second bellows inflates at a predetermined rate of inflation wherein as the second bellows inflates, the second bellows contacts the drive plate and moves the drive plate toward the first bellows such that the first bellows deflates wherein the predetermined rate of inflation of the second bellows is greater than the predetermined rate of inflation of the first bellows; activating the main control valve such that the fluid stops flowing to the second bellows and such that fluid flows to the first bellows such that the first bellows is inflated at the predetermined rate of inflation of the first bellows and wherein as the drive plate moves toward the second bellows, the second bellows deflates; and placing the objects on the conveyor plate and repeating steps (e) and (f) to move the objects along the conveyor plate.

The substance and advantages of the present invention will become increasingly apparent by reference to the following drawings and the description.

DESCRIPTION OF THE PREFERRED EMBODIMENT(S)

Figure 1:
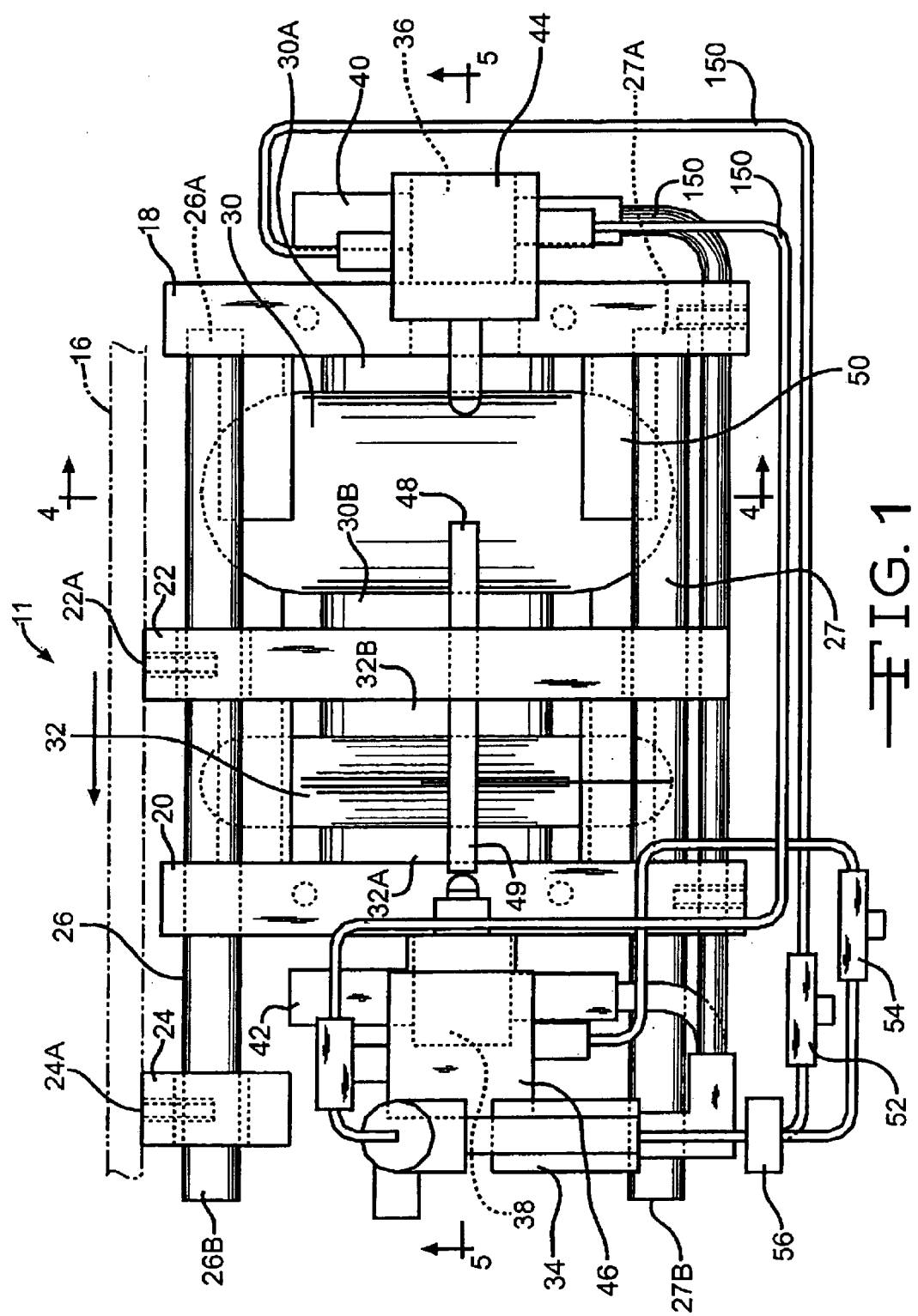
FIG. 1 is a side view of the conveyor motor 11 of the present invention.
Figure 2:
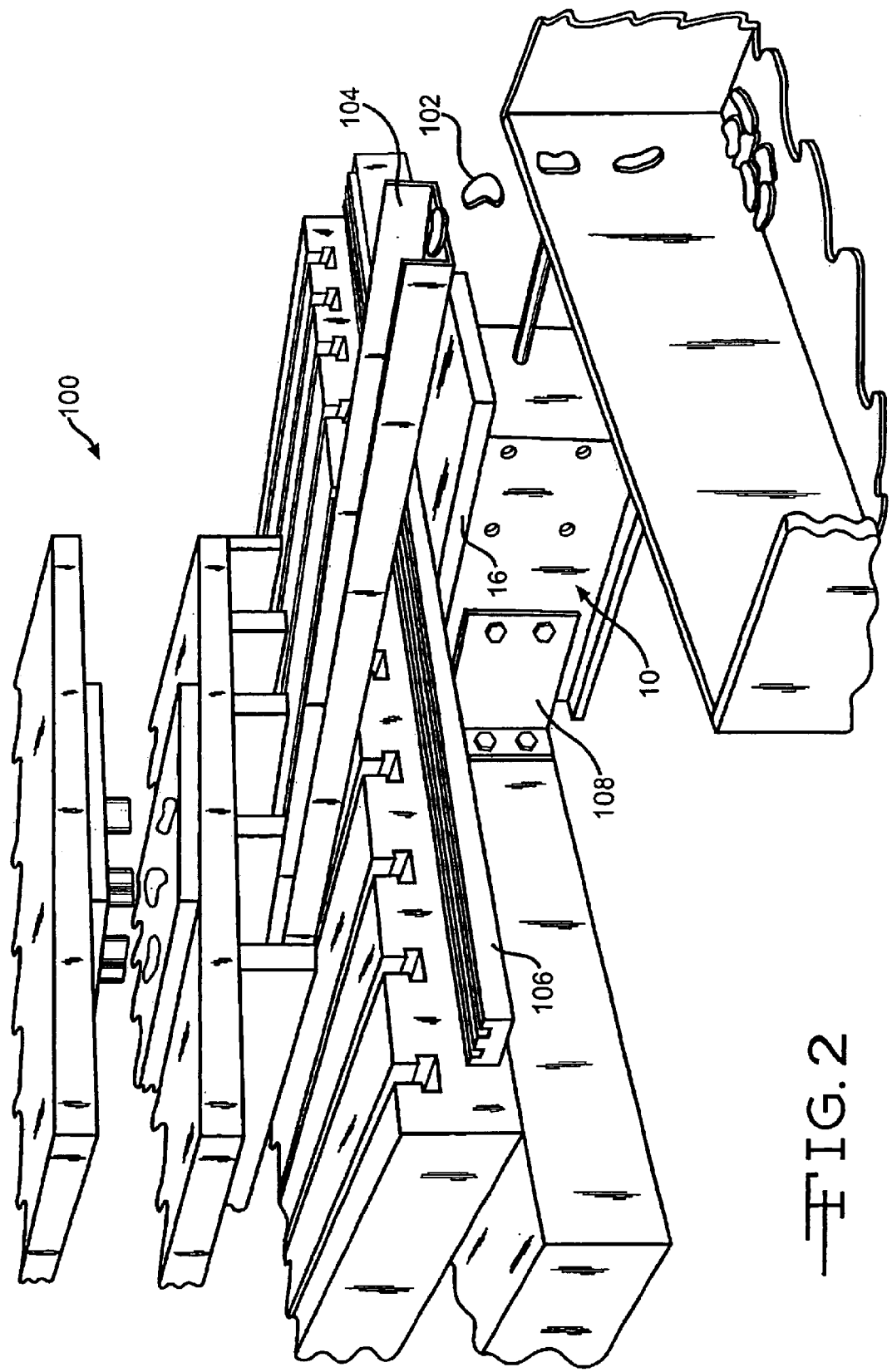
FIG. 2 is a perspective view showing the conveyor 10 mounted on a press 100.
Figure 5:
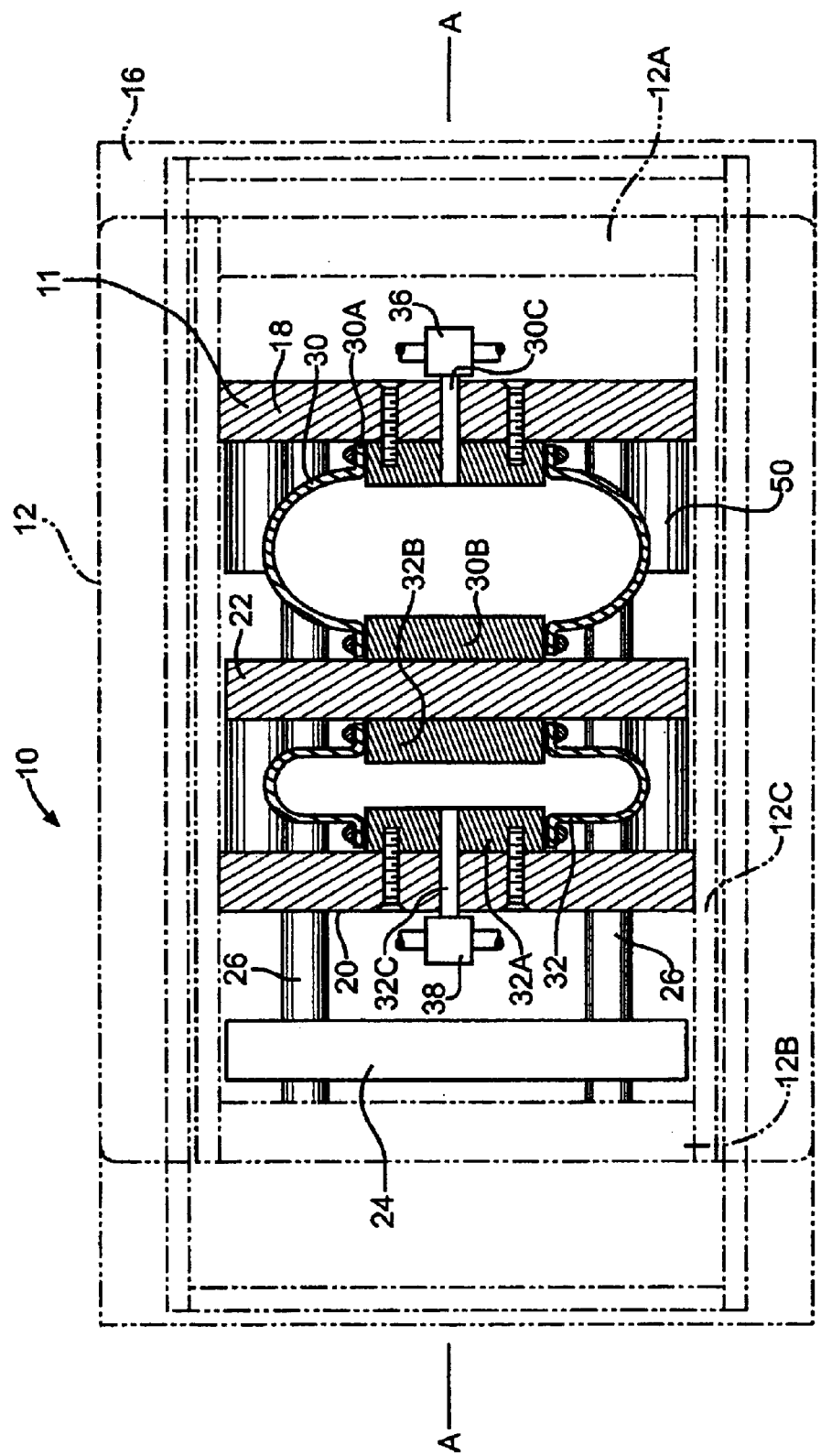
FIG. 5 is a cross-sectional view along the line 5—5 of FIG. 1 without the main control valve 34 and showing the first bellows 30 fully inflated and the second bellows 32 deflated.

FIG. 1 shows the pneumatic conveyor motor 11 of the present invention. The pneumatic conveyor motor 11 is intended to be used as the drive motor for a differential impulse or linear conveyor 10. The conveyor 10 can be used in the stamping industry to move objects 102 such as scrap or parts out of a stamping press 100 (FIG. 2). However, the conveyor 10 can be used in any industry to convey virtually any type of material or objects 102 along a horizontal or declined surface. The conveying device or conveyor 10 includes a housing 12 and a conveyor motor 11 having a fluid flow control system. The housing 12 has opposed first and second end walls 12A and 12B and opposed sidewalls 12C forming an inner chamber 14. A longitudinal axis A—A of the housing 12 extends between the end walls 12A and 12B (FIG. 5). A bottom wall 12D mounted on the bottom of the end walls 12A and 12B and the sidewalls 12C closes off the bottom of the inner chamber 14. A movable top conveyor plate 16 forms the top of the housing 12. In one (1) embodiment, the housing 12 has a rectangular shape with the sidewalls 12C longer than the end walls 12A and 12B.

The conveyor motor 11 is mounted in the inner chamber 14 of the housing 12 (FIG. 5). The conveyor motor 11 includes first and second bellows 30 and 32, first and second end plates 18 and 20, a pair of upper guide rods or shafts 26, a pair of lower guide rods or shafts 27, a drive or movable plate 22, a follower or secondary slider plate 24 and the fluid flow control system (FIG. 1). The fixed or stationary end plates 18 and 20 and the main drive plate 22 are positioned in the inner chamber 14 such as to extend between the sidewalls 12C of the housing 12 parallel to the end walls 12A and 12B. The first end plate 18 is positioned adjacent the first end wall 12A of the housing 12. The second end plate 20 is positioned adjacent the second end wall 12B of the housing 12. The drive plate 22 is spaced between the end plates 18 and 20. In one (1) embodiment, the follower plate 24 is mounted between the second end plate 20 and the second end wall 12B of the housing 12. However, the follower plate 24 can also be positioned between the first end plate 18 and the first end wall 12A of the housing 12. In one (1) embodiment, the end plates 18 and 20 extend the complete height of the housing 12 between the bottom wall 12D and the open top of the housing 12. In one (1) embodiment, the end plates 18 and 20 are flush with the open top of the housing 12. In one (1) embodiment, the drive plate 22 extends upward from the bottom wall 12D and beyond the open top of the housing 12. Thus, one (1) end 22A of the drive plate 22 extends out of the top of the housing 12. Similarly, one (1) end 24A of the follower plate 24 extends beyond the open top of the housing 12. In one (1) embodiment, the follower plate 24 does not extend the complete distance to the bottom wall 12D. In this embodiment, the length of the follower plate 24 is such as to not interfere with or contact the lower guide rods 27.

The movable conveyor plate 16 is mounted on the ends 22A and 24A of the drive plate 22 and the follower plate 24 above the top of the housing 12. The conveyor plate 16 is mounted at two (2) positions to help distribute the weight of the movable conveyor plate 16 and the load on the plate 16 along the length of the conveyor 10. The movable conveyor plate 16 has a flat top surface and can have any shape. In one (1) embodiment, the conveyor plate 16 has a flange or guard which extends downward toward the bottom wall 12D of the housing 12. In one (1) embodiment, the movable conveyor plate 16 has a rectangular shape. Conveyor trays 104 can be attached to the movable conveyor plate 16 (FIG. 2). The conveyor trays 104 can be of any type well known in the art. In one (1) embodiment, a crossbar 106 having longitudinal grooves is attached to the top surface of the conveyor plate 16 perpendicular to the longitudinal axis A—A of the housing 12. In this embodiment, the conveyor tray 104 is mounted in the groove of the crossbar 106 and extends along and parallel to the longitudinal axis A—A of the housing 12. The conveyor tray 104 can be positioned at different locations along the crossbar 106. In addition, several conveyor trays 104 may be connected to the crossbar 106.

The first and second upper and lower guide rods 26 and 27 extend parallel to the longitudinal axis A—A of the housing 12 and have first and second ends 26A, 26B, 27A and 27B. In one (1) embodiment, the guide rods 26 and 27 have a cylindrical shape. The first ends 26A and 27A of the guide rods 26 and 27 are fixedly mounted in the first end plate 18. The second end 26B and 27B of the guide rods 26 and 27 are mounted through the second end plate 20 and the follower plate 24. In one (1) embodiment, the second end plate 20 is fixably mounted on the upper and lower guide rods 26 and 27. The guide rods 26 and 27 could extend beyond the end plates 18 and 20 and be fixedly mounted to the end walls 12A and 12B of the housing 12. The guide rods 26 and 27 can be secured in or to the end walls 12A and 12B or end plates 18 or 20 by any well known means. The first and second upper guide rods 26 extend adjacent the open top of the housing 12 with each upper guide rod 26 adjacent one (1) of the sidewalls 12C of the housing 12. The lower guide rods 27 extend adjacent the bottom wall 12D of the housing 12. In one (1) embodiment, the first upper rods 26 are in the same horizontal plane and the second lower rods 27 are in a horizontal plane. The first upper rod 26 and the first lower rod 27 can also be in the same vertical plane and the second upper rod 26 and the second lower rod 27 can be in the same vertical plane. The spacing of the guide rods 26 and 27 provides support to all areas of the plates 18, 20 and 22. In one (1) embodiment, the guide rods 26 and 27 extend through the end plates 18 and 20, the drive plate 22 and the follower plate 24 adjacent each of the corners of the plates 18, 20, 22 and 24. The guide rods 26 and 27 extend through holes in the second end plate 20, the drive plate 22 and the follower plate 24. The size of the holes is such that the guide rods 26 and 27 can be easily inserted through the plates 18, 22 and 24. The follower plate 24 preferably has only two (2) holes such that the upper guide rods 26 can extend through the follower plate 24 and the follower plate 24 can move along the guide rods 26 between the second end wall 12B and the second end plate 20. The holes of the drive plate 22 and the follower plate 24 are provided with linear bearings (not shown) such that the drive plate 22 and follower plate 24 can easily move along the guide rods 26 and 27 with minimal resistance. In one (1) embodiment, the bearings are Frelon® bearings.

The first and second bellows 30 and 32 have first and second ends 30A and 30B and 32A and 32B with a flexible bellow extending therebetween. One (1) of the ends 30A or 30B or 32A or 32B of the bellows 30 and 32 has an inlet 30C or 32C. In one (1) embodiment, the first ends 30A and 32A of the bellows 30 and 32 have the inlet 30C and 32C. In one (1) embodiment, the bellows 30 and 32 are air bellows similar to those manufactured by Numatics, Inc. The first bellows 30 are positioned between the first end plate 18 and the drive plate 22. The second bellows 32 are positioned between the second end plate 20 and the drive plate 22. The bellows 30 and 32 are positioned such that the first end 30A and 32A is adjacent and in contact with the end plate 18 or 20 and the second end 30B and 32B is adjacent to the first or second side, respectively, of the drive plate 22. In one (1) embodiment, the first end 30A of the first bellows 30 is mounted on the first end plate 18 and the first end 32A of the second bellows 32 is mounted on the second end plate 20. In one (1) embodiment, the second ends 30B and 32B of the bellows 30 and 32 are mounted to the first and second sides of the drive plate 22, respectively. The bellows 30 and 32 are positioned such that the longitudinal axis of the bellows 30 and 32 are aligned and are parallel to the longitudinal axis A—A of the housing 12. The bellows 30 and 32 are mounted such as to be spaced between the upper guide rods 26 and the lower guide rods 27 and completely within the inner chamber 14 of the housing 12. The end plates 18 and 20 are provided with holes which are aligned in the inlets 30C and 32C of the first and second bellows 30 and 32 and allow for supplying fluid such as air to the bellows 30 and 32. In one (1) embodiment, the end plates 18 and 20 and drive plate 22 are provided with notches adjacent the bottom wall 12D of the housing 12 to allow for running of the fluid lines 150.

Figure 3:
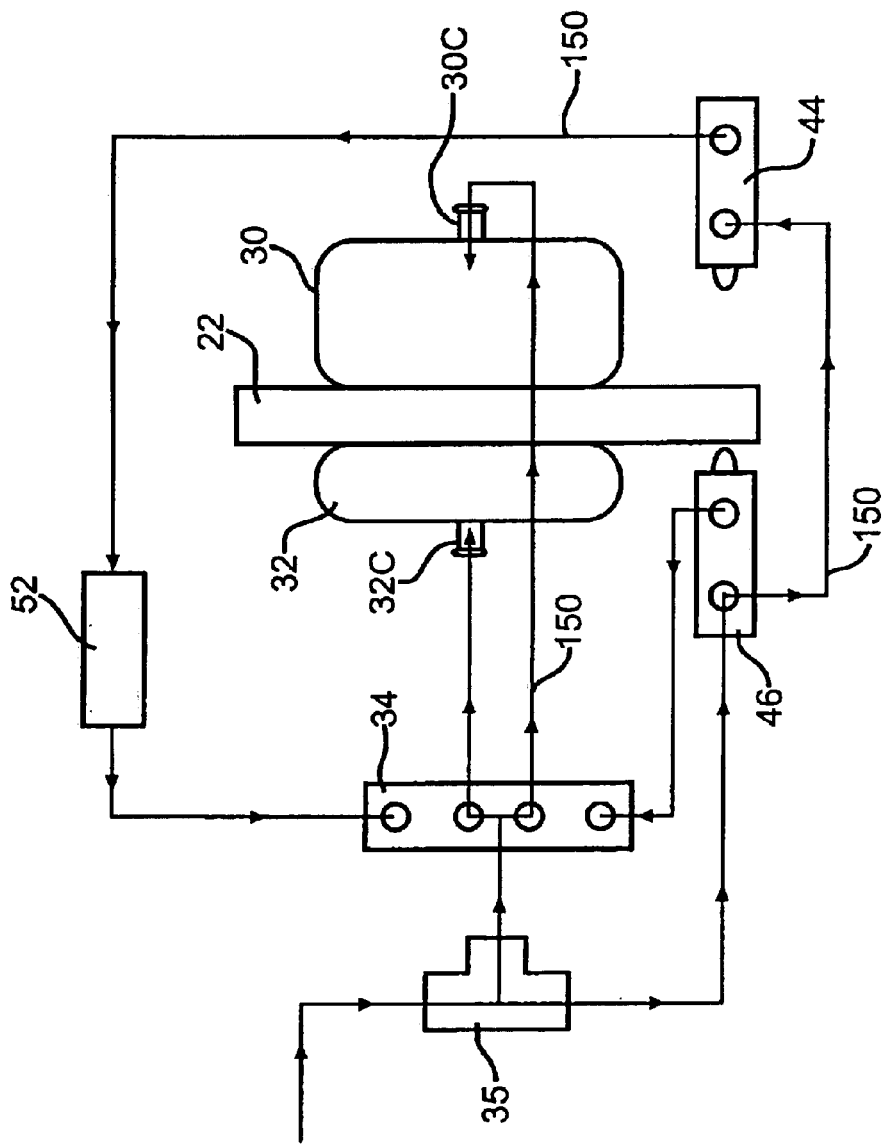
FIG. 3 is a schematic representation of the fluid lines 150 of the conveyor motor 11.
Figure 4:
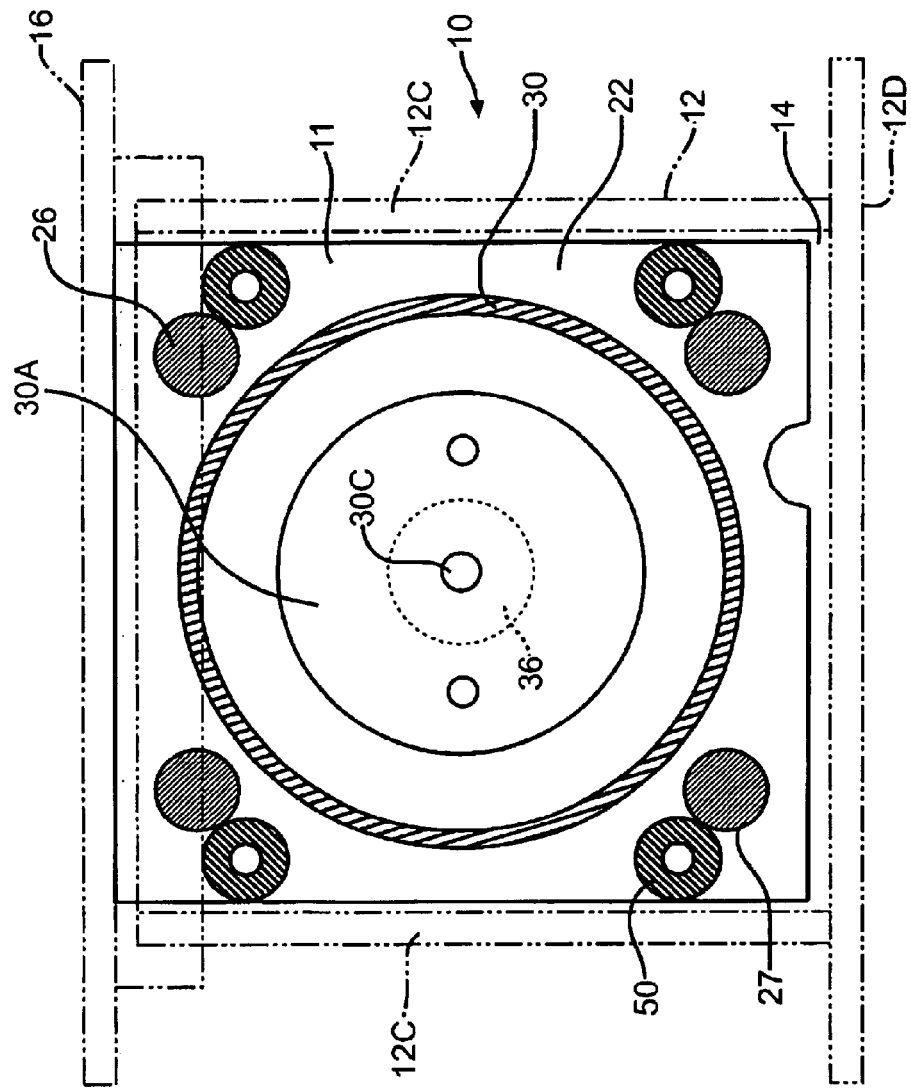
FIG. 4 is a cross-sectional view along the line 4—4 of FIG. 1 showing the guide rods 26 and 27, the bumper 50 and the inlet of the first bellows 30.

The fluid control system includes a main control valve 34, first and second valves 36 and 38, first and second limit switches 44 and 46, and a flow control valve 52 or 54 (FIG. 3). In one (1) embodiment, the main control valve 34 is mounted adjacent the second end wall 12B of the housing 12. In this embodiment, the second end wall 12B of the housing 12 is provided with a hole (not shown) which allows for connection of the fluid supply (not shown) to the main control valve 34. The main control valve 34 may be mounted to the second end plate 20 on a side opposite the second bellows 32. In one (1) embodiment, a tee 35 is provided between the inlet of the main control valve 34 and the fluid supply (not shown). The tee 35 allows the fluid supply to be connected to the main control valve 34 and the limit switches 44 and 46. The main control valve 34 is provided with two (2) output lines 150 connected to the first and second valves 36 and 38. The first and second valves 36 and 38 are connected to the inlets 30C and 32C of the first and second bellows 30 and 32, respectively. In one (1) embodiment, where the bellows 30 and 32 are mounted on the end plates 18 and 20, the first and second valves 36 and 38 are mounted on the side of the end plates 18 and 20 opposite the bellows 30 and 32 and are connected through holes in the end plates 18 and 20 to the inlets 30C and 32C of the bellows 30 and 32. The first and second valves 36 and 38 act as intake or inlet valves and allow for fluid to be inserted into the bellows 30 and 32. The valves 36 and 38 also act as quick exhaust valves and allow for the fluid in the bellows 30 and 32 to be quickly exhausted from the bellows 30 and 32, if necessary. The valves 36 and 38 can also be provided with a speed control muffler 40 or 42 which regulates the exhaust and allows for adjusting or metering the speed at which the fluid is exhausted from the bellows 30 and 32. The speed control muffler 40 or 42 also acts as a muffler to reduce the noise of the exhaust. In one (1) embodiment, the speed control muffler 40 or 42 is used only as a muffler and is not used to control the rate of exit of the exhaust.

In one (1) embodiment, the limit switches 44 and 46 are mounted adjacent each of the end plates 18 and 20 on one (1) of the sidewalls 12C of the housing 12 inside the inner chamber 14 of the housing 12. In one (1) embodiment, the sides of the end plates 18 and 20 adjacent the limit switches 44 and 46 are provided with notches to allow for mounting of the limit switches 44 and 46. The notches allow the trigger for the limit switches 44 and 46 to be accessible through the end plates 18 and 20. The drive plate 22 is provided with first and second trigger rods or posts 48 and 49. The first trigger rod 48 extends outward from the first side of the drive plate 22 in a direction toward the first end plate 18. The second trigger rod 49 extends outward from the second side of the drive plate 22 in a direction toward the second end plate 20. In one (1) embodiment, the first and second trigger rods 48 and 49 are a unitary piece which extends through a hole in the drive plate 22. The first and second trigger rods 48 and 49 are aligned with the triggers of the first and second limit switches 44 and 46, respectively. The trigger rods 48 and 49 are of a length such that the trigger rods 48 and 49 contact the triggers of the limit switches 44 and 46 when the drive plate 22 reaches a predetermined maximum position and before the drive plate 22 contacts the stationary plate 18 or 20. Bumpers or shock absorbers 50 are also mounted on each of the end plates 18 and 20 on the side adjacent the drive plate 22 to prevent the drive plate 22 from contacting the end plates 18 and 20. In one (1) embodiment, each end plate 18 or 20 has a bumper 50 at each corner. In one (1) embodiment, the limit switches 44 and 46 are pneumatic switches. In this embodiment, the limit switches 44 and 46 are preferably connected in series with a fluid supply line 150 extending from the tee 35 adjacent the main control valve 34 to the inlet of the second limit switch 46 and a fluid supply line 150 extending from the inlet of the second limit switch 46 to the inlet of the first limit switch 44. However, it is understood that the fluid could be supplied to the limit switches 44 and 46 using a variety of methods. Only a minimal amount of air is provided to the limit switches 44 and 46. The outlets of the limit switches 44 and 46 are connected by a second pair of fluid lines 150 to the main control valve 34. In one (1) embodiment, a first flow control valve 52 is provided in the fluid line 150 between the outlet of the first limit switch 44 and the control valve 34. In another embodiment, a second flow control valve 54 is provided in the fluid line 150 between the outlet of the second limit switch 46 and the main control valve 34. In this embodiment, a pneumatic bi-directional control switch 56 is also provided. The bi-directional control switch 56 is located between the first limit switch 44 and the main control valve 34 and between the second limit switch 46 and the main control valve 34.

To operate the conveyor device 10, the conveyor device 10 is completely constructed with the conveyor motor 11 in the housing 12 and the conveyor plate 16 connected to the drive plate 22 and follower plate 24. The conveyor tray 104 and crossbar 106 (if used) are also connected to the conveyor plate 16. Where the conveyor device 10 is used to remove scrap or parts 102 from a stamping press 100, the conveyor device 10 is mounted to the bottom of the press 100 by a bracket 108 (FIG. 2). The conveying device 10 is positioned such that when the press 100 is operating, the parts or scrap 102 will fall into one (1) end of the conveying tray 104 and be moved along the conveying tray 104 and out of the press 100 by operation of the conveying device 10. In one (1) embodiment, the conveyor motor 11 is bi-directional such that the parts 102 can be pulled out of the press 106 on the side adjacent the conveyor 10 or can be pushed through the press 100 to exit the press 100 on the side opposite the conveyor 10. When the conveyor 10 is in position, a source of fluid is connected to the tee 35 which is connected to the main control valve 34 and to the limit switches 44 and 46. In one (1) embodiment, in the initial position, the first bellows 30 is fully deflated and the movable conveyor plate 16 is fully forward toward the first end wall 12A of the housing 12. During operation, fluid is moved into the tee 35 and then distributed through supply lines 150 to the limits witches 44 and 46 and to the main control valve 34. Initially, fluid is supplied to both limit switches 44 and 46. The fluid is then distributed from the main control valve 34, through the various supply lines 150 to the first valve 36 and into the first bellows 30. As fluid moves through the first valve 36 and into the inner chamber of the first bellows 30, the first bellows 30 inflates and expands which moves the drive plate 22, the follower plate 24 and the conveyor plate 16 in a direction toward the second end wall 12B of the housing 12. When the drive plate 22 has moved the maximum distance forward toward the second end plate 20, the second trigger rod 48 contacts the trigger of the second limit switch 46 adjacent the second end plate 20 and activates the limit switch 46. When the second limit switch 46 is activated, a signal is sent from the second limit switch 46 to the main control valve 34. The signal causes the main control valve 34 to switch the flow of fluid from the first bellows 30 to the second bellows 32. The second limit switch 46 is adjusted such that as soon as the second limit switch 46 is activated, the signal is sent to the main control valve 34 and the control valve 34 instantaneously switches the flow of fluid. Thus, there is no pause or stop between the filling of the first bellows 30 and the filling of the second bellows 32. As the second bellows 32 fills with fluid, the second bellows 32 inflates and expands and moves the drive plate 22 toward the first end plate 18. Movement of the drive plate 22 toward the first end plate 18 causes the first bellows 30 to be deflated. The first valve 36 allows the fluid in the first bellows 30 to be quickly exhausted, thus reducing the resistance on the drive plate 22. The speed control muffler 40 reduces the noise caused by the fluid quickly leaving the first bellows 30. The speed control muffler 40 can be adjusted to control the flow of fluid exiting the first bellows 30. In one (1) embodiment, the main control valve 34 allows the full amount of fluid flow at a predetermined rate of flow to the second valve 38 which: allows the second bellows 32 to fill quickly and to move the drive plate 22 and the conveyor plate 16 quickly in the direction toward the first end plate 18. When the drive plate 22 has traveled the maximum predetermined distance toward the first end plate 18, the first trigger rod 48 contacts the trigger of the first limit switch 44 and activates the switch 44. Activation of the first limit switch 44 causes the first limit switch 44 to send a signal back to the main control valve 34. When the signal reaches the first flow control valve 52, the first flow control valve 52 controls and alters the signal to the main control valve 34. In one (1) embodiment, the first flow control valve 52 reduces the signal. The reduction of the signal to the main control valve 34 causes a slowdown in the switching of the fluid flow from the second bellows 32 to the first bellows 30 and causes a momentary pause in the movement of the drive plate 22. Thus, the transition of the conveyor plate 16 from moving in the backward direction toward the first end wall 18 to moving in the opposite forward direction toward the second end wall 20 is not instantaneous. The pause in the movement of the conveyor plate 16 allows for the conveyor plate 16 or conveyor tray 104 to reestablish a frictional connection with the items or objects 102 on the conveyor plate 16 or in the tray 104. The first flow control valve 52 also reduces the rate at which the main control valve 34 sends fluid to the first bellows 30. In this embodiment, the rate of inflation of the second bellows 32 is greater than the rate of inflation of the first bellows 30. The first flow control valve 52 allows a predetermined rate of flow of fluid to the first bellows 30. In one (1) embodiment, the rate of the flow of fluid to the first bellows 30 begins slow and gradually reaches its full speed. This gradual increase in fluid flow results in a gradual acceleration of the drive plate 22 in the forward direction which is slower than the acceleration of the drive plate 22 in the rearward direction. The quick expansion or inflation of the second bellows 32 causes the drive plate 22 to move quickly toward the first end plate 18 while the gradual, slower expansion or inflation of the first bellows 30 causes the drive plate 22 to move more slowly in the forward direction toward the second end plate 20. The uneven bi-directional movement of the drive plate 22 with the conveyor plate 16 causes the objects or items 102 on the conveyor tray 104 to move in a direction toward the second end wall 20 of the housing In one (1) embodiment, the conveyor 10 is a bi-directional conveyor and the conveyor motor 11 can be operated to move objects 102 in either direction along the conveyor plate 16. In this embodiment, the conveyor motor 11 is provided with the second flow control valve 54 and the bi-directional control switch 56. The bi-directional control switch 56 allows for changing the rate of inflation of the bellows 30 and 32 which allows for changing the direction of flow of parts 102 along the conveyor 10. To operate the conveyor 10 to move the parts 102 in the opposite direction toward the first end wall 12A, the bi-directional control switch 56 is activated. The bi-directional control switch 56 changes the direction of the flow of fluid such that the second flow control valve 54 is used and the first flow control valve 52 is bypassed. In this embodiment, the predetermined rate of fluid flow to the second bellows 32 is less than the predetermined rate of fluid flow to the first bellows 30. The second flow control valve 54 operates similarly to the first flow valve 52 and allows for controlling or metering the signal from the second limit switch 46 to the main control valve 34 and causes a slowdown in the switching of fluid flow from the first bellows 30 to the second bellows 32 and causes a reduction in the rate of fluid flow to the second bellows 32 while allowing the first bellows 30 to inflate quickly.

It is intended that the foregoing description be only illustrative of the present invention and that the present invention be limited only by the hereinafter appended claims.

I claim:

1. A conveyor motor for moving a conveyor plate to move objects along the conveyor plate, which comprises:
   (a) a first bellows mounted adjacent the conveyor plate and configured to move the conveyor plate and having an inlet;
   (b) a second bellows mounted adjacent the conveyor plate and configured to move the conveyor plate and having an inlet; and
   (c) a main control valve in fluid communication with the inlet of the first bellows and the inlet of the second bellows wherein the main control valve is configured such that a rate of inflation of the second bellows is greater than a rate of inflation of the first bellows.

2. The conveyor motor of claim 1 wherein the first and second bellows are mounted such as to be coaxial.

3. The conveyor motor of claim 1 wherein an end of the first bellows is mounted to a first end plate, and wherein an end of the second bellows is mounted to a second end plate.

4. The conveyor of claim 1 wherein a first valve is in fluid communication with the inlet of the first bellows and controls a flow of fluid into and out of the first bellows.

5. The conveyor of claim 1 wherein a second valve is in fluid communication with the inlet of the second bellows and controls a flow of fluid into and out of the second bellows.

6. The conveyor of claim 1 wherein a first limit switch is mounted adjacent the first bellows, wherein a second limit switch is mounted adjacent the second bellows and wherein the first and second limit switches are connected to the main control valve.

7. The conveyor of claim 6 wherein the first and second limit switches are pneumatic switches which are in fluid communication with the main control valve.

8. The conveyor of claim 6 wherein a flow control valve is connected between at least one of the first or second limit switches and the main control valve and wherein the flow control valve is configured to adjust a signal between one of the first and second limit switches and the main control value to control a time of activation of the main control valve.

9. The conveyor of claim 8 wherein the flow control valve is configured to delay the time of activation of the main control valve.

10. The conveyor of claim 6 wherein a first flow valve is connected between the first limit switch and the main control value and a second flow valve is connected between the second limit switch and the main control valve, wherein a bi-directional switch is positioned between the first and second flow valves and the main control valve and wherein the bi-directional switch is configured to select one of the first or second limit switches depending on a direction of flow of the objects along the conveyor plate.

11. The conveyor motor of claim 1 wherein the first and second bellows are air bellows.

12. A conveyor for moving objects, which comprises:
   (a) a conveyor plate;
   (b) a housing;
   (c) a first bellows mounted in the housing and configured to move the conveyor plate in a first direction and having an inlet;
   (d) a second bellows mounted in the housing and configured to move the conveyor plate in a second direction and having an inlet; and
   (e) a main control valve in fluid communication with the inlet of the first bellows and the inlet of the second bellows wherein the main valve is configured such that a rate of inflation of the second bellows is greater that a rate of inflation of the first bellows.

13. The conveyor of claim 12 wherein the first and second bellows are mounted such as to be coaxial.

14. The conveyor of claim 12 wherein an end of the first bellows is mounted to a first end plate and wherein an end of the second bellows is mounted to a second end plate.

15. The conveyor of claim 14 wherein a first pair of guide rods having first and second ends are fixably mounted adjacent the first ends to the first end plate and are fixably mounted adjacent the second ends to the second end plate.

16. The conveyor of claim 15 wherein a second pair of guide rods having first and second ends are fixably mounted adjacent the first ends to the first end plate and are fixably mounted adjacent the second ends to the second end plate and wherein the second pair of guide rods are spaced apart from and parallel to the first pair of guide rods.

17. The conveyor of claim 15 wherein the conveyor plate is connected to the first pair of guide rods.

18. The conveyor of claim 12 wherein a first valve is in fluid communication with the inlet of the first bellows and controls a flow of fluid into and out of the first bellows.

19. The conveyor of claim 12 wherein a second valve is in fluid communication with the inlet of the second bellows and controls a flow of fluid into and out of the second bellows.

20. The conveyor of claim 12 wherein a first limit switch is mounted adjacent the first bellows, wherein a second limit switch is mounted adjacent the second bellows and wherein the first and second limit switches are connected to the main control valve.

21. The conveyor of claim 20 wherein the first and second limit switches are pneumatic switches which are in fluid communication with the main control valve.

22. The conveyor of claim 20 wherein a flow control valve is connected between at least one of the first or second limit switches and the main control valve and wherein the flow control valve is configured to adjust a signal between one of the first and second limit switches and the main control value to control a time of activation of the main control valve.

23. The conveyor of claim 22 wherein the flow control valve is configured to delay the time of activation of the main control valve.

24. The conveyor of claim 20 wherein a first flow valve is connected between the first limit switch and the main control value and a second flow valve is connected between the second limit switch and the main control valve, wherein a bi-directional switch is positioned between the first and second flow valves and the main control valve and wherein the bi-directional switch is configured to select one of the first or second limit switches depending on a direction of movement of the objects.

25. The conveyor of claim 12 wherein the housing has a bottom wall, a first and second end wall and a first and second side wall forming an inner chamber and wherein the first and second bellows and main control valve are mounted in the inner chamber of the housing.

26. The conveyor of claim 25 wherein the conveyor plate forms a top wall of the housing.

27. The conveyor of claim 26 wherein a crossbar is mounted on the conveyor plate and wherein a conveyor tray for holding the objects is mounted on the crossbar.

28. A method for moving objects, which comprises:

(a) providing a conveyor including a conveyor motor having a conveyor plate; a first bellows adjacent to and configured to move the conveyor plate and having an inlet; a second bellows adjacent to and configured to move the conveyor plate and having an inlet; and a main control valve in fluid communication with the inlet of the first bellows and the inlet of the second bellows;

(b) providing a fluid source;

(c) connecting the fluid source to the main control valve;

(d) activating the main control valve so that fluid flows from the fluid source into the inlet of the first bellows and inflates the first bellows at a predetermined rate of inflation of the first bellows wherein as the first bellows inflates, the first bellows moves the conveyor plate toward the second bellows;

(e) activating the main control valve so that the fluid stops flowing to the first bellows and so that fluid flows from the fluid source into the inlet of the second bellows and inflates the second bellows at a predetermined rate of inflation wherein as the second bellows inflates, the second bellows moves the conveyor plate toward the first bellows and the first bellows deflates, wherein the predetermined rate of inflation of the second bellows is greater than the predetermined rate of inflation of the first bellows;

(f) activating the main control valve so that the fluid stops flowing to the second bellows and so that fluid flows to the first bellows and inflates the first bellows at the predetermined rate of inflation of the first bellows and the second bellows deflates; and (g) placing the objects on the conveyor plate and repeating steps (e) and (f) to move the objects along the conveyor plate.

29. The method of claim 28 wherein in step (e) stoppage of the flow of fluid to the first bellows and initiation of the flow of fluid to the second bellows occur simultaneously.

30. The method of claim 28 wherein in step (f) stoppage of the flow of fluid to the second bellows occurs prior to initiation of the flow of fluid to the first bellows.

31. The method of claim 28 wherein in steps (d) and (f) the flow of fluid from the fluid source to the inlet of the first bellows gradually increases from no flow to full flow.

32. The method of claim 28 wherein first and second limit switches are provided and are connected to the main control valve, wherein in steps (d), (e), (f) and (g) the main control valve is activated by one of the limit switches.

33. The method of claim 32 wherein the first and second limit switches are pneumatic switches and wherein in step (c) the fluid source is connected to the limit switches.

34. The method of claim 32 wherein a flow control valve is positioned between the second limit switch and the main control valve and wherein in step (f) the flow control value controls a speed at which the main control valve is activated.

35. The method of claim 32 wherein a flow control valve is positioned between the second limit switch and the main control valve and wherein, in step (f) the flow control valve controls the predetermined rate of inflation of the first bellows.

36. The method of claim 32 wherein a first flow valve is connected between the first limit switch and the main control value and second flow valve is connected between the second limit switch and the main control valve, wherein a bi-directional switch is positioned between the first and second flow valves and the main control valve and wherein the bi-directional switch is configured to select one of the first or second flow valves depending on a direction of flow of the objects along the conveyor plate wherein prior to step (d) the bi-directional switch is activated such that in steps (d), (e) and (f) the predetermined rate of inflation of the first bellows and the predetermined rate of inflation of the second bellows are adjusted depending on which of the first or second flow valves is selected.

37. The conveyor motor of claim 1 wherein the first bellows is configured to move the conveyor plate in a first direction.

38. The conveyor motor of claim 37 wherein the second bellows is configured to move the conveyor plate in a second direction.

39. The conveyor motor of claim 3 wherein the first bellows is configured to move the conveyor plate toward the second end plate and the second bellows is configured to move the conveyor plate toward the first end plate.

* * * * *

UNITED STATES PATENT AND TRADEMARK OFFICE
CERTIFICATE OF CORRECTION

PATENT NO. : 6,880,693 B2  
DATED : April 19, 2005  
INVENTOR(S) : Dennis A. Trestain It is certified that error appears in the above-identified patent and that said Letters Patent is hereby corrected as shown below:

Column 8,  
Lines 16 and 17, "limits witches 44" should be -- limit switches 44 --.  
Line 50, "38 which: allows the" should be -- 38 which allows the --.

Column 12,  
Line 50, after "of the first" insert -- bellows and the predetermined rate of inflation of the second bellows are adjusted depending on which of the first or --.

Signed and Sealed this

Nineteenth Day of July, 2005

JON W. DUDAS  
*Director of the United States Patent and Trademark Office*